United States Patent [19]
Hancock et al.

[11] 3,796,565
[45] Mar. 12, 1974

[54] PRODUCTION OF POROUS NICKEL PLATES

[75] Inventors: Herbert Arthur Hancock, Dartmouth, Nova Scotia; David John Ivor Evans, North Edmonton, Alberta, both of Canada

[73] Assignee: Sherritt Gordon Mines Limited, Toronto, Ontario, Canada

[22] Filed: Mar. 16, 1973

[21] Appl. No.: 341,865

[52] U.S. Cl............................ 75/211, 75/222, 75/224
[51] Int. Cl. ............................ B22f 5/00, B22f 3/10
[58] Field of Search...................... 75/211, 222, 224

[56] References Cited
UNITED STATES PATENTS

| 3,397,057 | 8/1968 | Harrington et al. | 75/211 |
| 3,001,875 | 9/1961 | Thein-chi et al. | 75/211 |
| 2,819,962 | 1/1958 | Salauze | 75/211 |

FOREIGN PATENTS OR APPLICATIONS

| 2,152,619 | 5/1972 | Germany | 75/211 |

*Primary Examiner*—Carl D. Quarforth
*Assistant Examiner*—B. Hunt

[57] ABSTRACT

The process involves providing starting material composed of nickel powder smaller than 270 mesh standard Tyler screen. The nickel oxide content of the starting powder is adjusted to 0.7 to 1.4 percent by weight and the powder is slurried in a volatile liquid, optionally containing an organic binder. The slurry is heated to a temperature below that at which sintering occurs to evaporate the volatile liquid then the slurry is heated at sintering temperature in a reducing atmosphere.

10 Claims, No Drawings

PRODUCTION OF POROUS NICKEL PLATES

This invention relates to the production of porous nickel plates and is particularly directed to the production of strong, porous plates for electro-chemical devices.

Sintered plates are commonly used as substrates into which active materials of battery electrodes are embedded. In general, electro-chemical activity depends upon the quantity of active material embedded in the electrode. The quantity of active material which can be introduced per unit volume of plate depends upon its porosity. By increasing the porosity of the plate therefore the capacity for the active material is increased. In practice however the degree of porosity of the plate is limited by the required strength of the plate. The plate must be strong enough to withstand stresses during fabrication and during its active life.

Varous methods are employed for producing high strength porous plates for electrodes. On method involves forminga laminar structure composed of a layer of highly porous but relatively weak material bonded to one or more layers of less permeable but strong supporting grid. The resulting plate has satisfactory strength but has a relatively low average porosity and accordingly, has limited capacity for active material.

Another method involves the addition of a volatile, solid powder in the form of a dispersion to powder capable of sintering to a plate of high strength. At sintering temperature, the volatile powder largely volatilizes leaving voids or pores in the sintered material. The porosity of such plates is not however high because the pores after volatilization are largely contracted by the high temperature required to sinter the powder.

It has been found that a high strength, highly porous nickel plate can be produced by a surprisingly simple and effective method. The plate has a uniform tensile strength and porosity throughout and requires no supporting grid. The method generally involves the steps of providing a starting material composed of nickel powder of less than about 270 mesh standard Tyler screen in size; adjusting the content of nickel oxide in said starting material to about 0.7 to about 1.4 percent by weight; dispersing the so-adjusted starting material in a volatile liquid to form a slurry; heating the slurry to a temperature below sintering temperature but sufficient to evaporate the volatile liquid fraction thereof; and sintering said heated slurry in a reducing atmosphere to a finished sintered plate.

During the sintering operation, the nickel oxide in the powder composition is decomposed to nickel by the reducing atmosphere. It is believed that this fresly reduced nickel activates the sintering operation thereby accelerating the bonding of the individual nickel particles. As a result, the sintering operation may be carried out relatively quickly thereby minimizing shrinkage and loss of porosity without sacrifice to the tensile strength of the finished plate.

The starting material for the process of the invention is substantially pure metallic nickel powder. Preferably, use is made of powder which has an irregular shape, a low bulk density and shrinks only slightly when sintered since such powder may be fabricated into sintered plates of very high porosity. The size of the starting nickel particles has an important bearing on the strength of the finished plates produced by the process of the present invention. The particles should be smaller than about minus 270 standard Tyler screen in size. Plates produced from larger particles are weak and are unsuitable for use as battery plates unless they are reinforced by means of a supporting grid or other structure. The strength of plates increases as the size of starting nickel particles decreases and therefore where high strength plates are required, the starting nickel particles should be as small as possible. However, the smaller the starting particles the more rapidly they will sinter and accordingly the less porous will be the plates produced therefrom. Thus a balance must be stuck between high strength and high porosity. In general, it is preferred to use nickel particles of about 400 mesh in size since plates produced from such particles have both high strength and satisfactory porosity.

High purity nickel powder of required size is commerically available at the present time. Particularly suitable nickel powders may be produced by the process described in Canadian Pat. No. 774,036.

The content of nickel oxide in the starting nickel powder is adjusted within the range of about 0.7 to 1.4 percent by weight based on the total weight of nickel powder plus nickel oxide. Adjustment of the nickel oxide content may be effected in a number of ways. Material which decomposes to nickel oxide may be combined with the nickel powder. Such material includes nickel hydroxde and an oxidazable nickel powder such as nickel-graphite. After the material has been added to the nickel powder, the material is decomposed by heating under controlled oxidizing conditions to ensure formation of the required amount of nickel oxide. Alter natively, the nickel oxide content may be adjusted by the addition of a controlled amount of an oxidizing agent to the slurry. The oxidizing agent reacts with a stoichiometrically equivalent amount of nickel powder in the slurry to produce the required amount of nickel oxide. Ammonium nitrate is a suitable oxidizing agent for this purpose.

A further method for adjustment of the nickel oxide content of the slurry involves controlled heating of the nickel powder, prior to slurrying in the liquid medium, in order to convert a desired amount of nickel to nickel oxide. Oxidation of the nickel powder may also be effected by treating the nickel in a warm aerated salt solution. Suitable salts for this purpose include ammonium-sulphate, ammonium-chloride, ammonium-acetate, ammonium-carbonate, ammonium-nitrate, sodium-chloride, sodium-nitrate and potassium chloride. Ammonium hydroxide is also suitable for this purpose.

The preferred method of nickel oxide adjustment is by addition of a controlled amount of freshly precipitated nickel hydroxide. The nickel hydroxide may be prepared by the addition of sodium hydroxide to a solution of nickel nitrate.

As previously indicated, it is important to add to the powdered mixture only sufficient nicke oxide-producing substance so that the nickel oxide content of the mixture prior to sintering is within the range of 0.7 to 1.4 percent by weight. The tensile strength of the sintered nickel plate drops off sharply as the nickel oxide content of the slurry prior to sintering decreases below 0.7 percent. As the nickel oxide content increases above 1.4 percent, there is a decrease not only in the tensile strength of the finished plate but in its porosity.

Following the nickel oxide adjustment step, the powdered mixture is dispersed in a liquid to form a slurry. The liquid must volatilize at sintering temperature and must be unreactive with the powder mixture. Water is the most practical and economic liquid for this purpose.

The slurrying liquid should be sufficiently viscous so that the the powder mixture does not settle out. It is desirable to add to the slurry in order to give it a sufficient viscosity a small uantity of one of such organic substances as halogenated gelatins, starch soluble derivatives of cellulose such as the alkaline or ammonium salts of carboxy methyl ceullose hydroxy alkyl celluloses, hydroxy ethyl cellulose and hydroxy propyl cellulose. The cellulose derivatives in particular are used in very small quantities to make the slurry highly viscous. In addition, these derivatives act as binders for the slurry.

Generally, the slurry should contain about 25 percent to about 75 percent by weight solids. When the solids content is less than about 25 percent, there is not sufficient contact between the particles to provide self-supporting metal plate, while metal particles in the amount greater than about 75 percent by weight generally do not permit the inclusion of sufficient binder to permit the formation of a self-supporting plate.

The resulting slurry is formed into plates of the required dimensions and is then subjected to a heating operation conducted at a temperature and for sufficient time to ensure substantially complete elimination of the volatile fraction of the slurry and elimination of water of hydration where nickel hydroxide is present in the slurry. In most cases, the heating operation can be accomplished by raising the temperature of the slurry to about 1,200° F. and maintaining the slurry at such temperature for about 10 minutes.

The thus-heated plates are then passed to a sintering operation in which they are heated to and maintained at a temperature within the range of 1,500° to 1,700° F. The sintering operation is terminated as soon as the nickel particles have bonded to form finished plates of the required strength and porosity. Usually 20 to 30 minutes is sufficient for this purpose. The sintering operation should not be continued longer than necessary since prolonged sintering results in plates of low porosity.

During the sintering operation, th powdered mixture must be maintained in contact with a reducing gas and hydrogen is preferred for this purpose. At sintering temperature any organic substances added to the powdered mixture are given off usually without leaving any appreciable residue. There is accordingly provided substantially pure porous nickel plates which can optionally be impregnated with active material such as nickel hydroxide to form a positive electrode or with zinc or cadmium hydroxide to form a negative electrode.

The final nickel plate has an unusually high porosity and capacity for active material and also has a high degree of mechanical strength.

The invention will now be described with references to the following non-limitative examples.

EXAMPLE 1

This example illustrates the importance of careful adjustment of the nickel oxide content of the powdered mixture prior to the sintering operation. The nickel oxide content of the test mixture was adjusted using nickel hydroxide freshly precipitated from solution by the addition of sodium hydroxide to a solution of nickel nitrate. The precipitate was washed until the conductivity of the wash water reached a low value then it was combined with water containing 2 percent by weight methyl cellulose to form a pulp. A number of slurry samples was prepared by combining the pulp with varying amounts of nickel powder containing in excess of 99 percent Ni and the balance Co, Cu, Fe, S and C.

The slurry samples were pre-heated for 10 minutes at 1,275° F. to decompose the nickel hydroxide then were formed into plates in a graphite mould and were sintered at 1,650° F. for a period of 20 minutes in the presence of dry hydrogen. The tensile strength and porosity of the resulting sintered plates are set out in the following table.

TABLE I

| % by weight nickel oxide resulting from decomposition of added nickel hydroxide | Tensile strength of sintered plate (p.s.i.) | Porosity of sintered plate (%) |
|---|---|---|
| 0.32 | 42 | 91 |
| 0.64 | 61 | 89 |
| 0.95 | 90 | 90 |
| 1.4 | 105 | 89 |
| 1.8 | 30 | 89 |
| 3.3 | 30 | 87 |

The table shows that as little as 0.95 percent nickel oxide resulting from the decomposition of nickel hydroxide is capable of more than doubling the strength of the sintered plate with only a slight decrease in the porosity. However, nickel oxide added in excess of 1.4 percent by eight has a detrimental effect on the strength of the plate.

EXAMPLE 2

This example illustrates the effect of the particle size of the starting nickel powder. Samples were prepared using various sizes of nickel powder of the same composition as that employed in Example 1. The nickel powder was slurried in water containing 2 percent methocel and ammonium nitrate (ammonium nitrate:-nickel weight ratio = 0.5:100). The slurry samples were dried at 212° F. then were placed in graphite moulds and where sintered at 1,650° F. for 20 minutes in a hydrogen atmosphere The finished plates were rotated on a turn-table under a stiff brush approximately ½ inch wide with the bristles trimmed to approximately ⅛ – ¼ inch in length. The weight on the brush was 344 grams and the brush swept out an area on the upper surface of the plates approximately 1 sq. inch. Each plate was rotated 240 times at a speed of 250 r.p.m. The abrasion resistance of the plates was determined by measuring their loss of weight. The porosity of the plates was also measured. The results are as follows:

TABLE II

| Particle size of starting nickel powder (Standard Tyler screen alalysis) | Abrasion loss (mg) | Porosity (%) |
|---|---|---|
| −200+270 | Over 15 | 91.8 |
| −270+325 | 15 | 91.9 |
| +325−400 | 1 | 90.5 |
| −400 | 0 | 87.5 |

The results contained in Table II show that the particle size of the starting nickel particles has a marked effect on the strength of the finished sintered plates. Plates produced from particles over 200 mesh in size are generally too weak for use in batteries. The porosity of the finished plates diminishes with decreasing starting particle size. For most applications, a porosity of 85 percent is satisfactory, thus useful battery plates may be produced from starting nickel particles as small as 400 mesh.

What we claim as new and desire to protect by Letters Patent of the United States is:

1. A process for making a porous nickel plate including the steps of: providing a starting material composed of nickel powder of less than about 270 mesh standard Tyler screen in size; adjusting the content of nickel oxide in said starting material to about 0.7 to about 1.4 percent by weight; dispersing to so-adjusted starting material in a volatile liquid to form a slurry; heating the slurry to a temperature below sintering temperature but sufficient to evaporate the volatile liquid fraction thereof; and sintering said heated slurry in a reducing atmosphere to a finished sintered plate.

2. The process as claimed in claim 1 wherein the starting material is larger than about 400 mesh standard Tyler screen in size.

3. The process as claimed in claim 1 wherein the nickel oxide constant of said starting material is adjusted by the addition thereto of freshly precipitated nickel hydroxide followed by heating to decompose the nickel hydroxide to nickel oxide.

4. The process as claimed in claim 1 wherein the sintering operation takes place in a hydrogen atmosphere.

5. A process for making a porous nickel plate including the steps of: providing a starting material composed of nickel pwder of less than about 270 mesh standard Tyler screen in size; adjusting the content of nickel oxide in said starting material to about 0.7 to about 1.4 percent by weight; dispersing the so-adjusted starting material in a volatile liquid to form a slurry; providing in said slurry an organic binder; heating said slurry to a temperature below sintering temperature but sufficient to evaporate the volatile liquid fraction thereof; and sintering said heated slurry in a reducing atmosphere to a finished sintered plate.

6. The process as claimed in claim 5 wherein the starting material is larger than about 400 mesh standard Tyler screen in size.

7. The process as claimed in claim 5 wherein the nickel oxide content of said starting material is adjusted by the addition thereto of freshly precipitated nickel hydroxide followed by heating to decompose the nickel hydroxide to nickel oxide.

8. The process as claimed in claim 5 wherein the sintering operation takes place in a hydrogen atmosphere.

9. The process as claimed in claim 5 wherein said organic binder is chosen from the group comprising an alkaline salt of carboxy methyl cellulose, ammonium salt of carboxy methyl cellulose, hydroxy alkyl cellulose, hydroxy ethyle cellulose and hydroxy propyl cellulose.

10. A process for making a porous nickel plate including the steps of: providing a starting material composed of nickel powder of less than about 270 mesh standard Tyler screen in size; adjusting the content of nickel oxide in said starting material to about 0.7 to about 1.4 percent by weight; dispersing the so-adjusted starting material in a volatile liquid to form a slurry; providing in said slurry an organic binder; forming below sintering temperature but sufficient to evaporate the volatile liquid fraction thereof; and sintering said heated plate in a reducing atmosphere.

* * * * *

UNITED STATES PATENT AND TRADEMARK OFFICE
CERTIFICATE OF CORRECTION

PATENT NO. : 3,796,565
DATED : March 17, 1974
INVENTOR(S) : Herbert A. Hancock

It is certified that error appears in the above-identified patent and that said Letters Patent are hereby corrected as shown below:

Claim 10, between lines 8 and 9 insert the following:

"said slurry into a plate; heating said plate to a temperature"

Signed and Sealed this twenty-second Day of June 1976

[SEAL]

Attest:

RUTH C. MASON
Attesting Officer

C. MARSHALL DANN
Commissioner of Patents and Trademarks